(12) United States Patent
Yamamoto et al.

(10) Patent No.: US 6,272,841 B2
(45) Date of Patent: *Aug. 14, 2001

(54) COMBINED CYCLE POWER PLANT

(75) Inventors: Hiroyuki Yamamoto; Hideo Kimura, both of Takasago (JP)

(73) Assignee: Mitsubishi Heavy Industries, Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/381,292
(22) PCT Filed: Jan. 23, 1998
(86) PCT No.: PCT/JP98/00259
  § 371 Date: Sep. 22, 1999
  § 102(e) Date: Sep. 22, 1999
(87) PCT Pub. No.: WO99/37890
  PCT Pub. Date: Jul. 29, 1999
(51) Int. Cl.[7] .................................................. F02C 6/00
(52) U.S. Cl. .................................................... 60/39.182
(58) Field of Search ................................. 60/39.182

(56) References Cited

U.S. PATENT DOCUMENTS 5,628,179   5/1997   Tomlinson .

FOREIGN PATENT DOCUMENTS

| 0 736 669 | 10/1996 | (EP) . |
| 5-163960 | 6/1993 | (JP) . |
| 9-4417 | 1/1997 | (JP) . |
| 9-280010 | 10/1997 | (JP) . |

Primary Examiner—Timothy S. Thorpe
Assistant Examiner—Ehud Gartenberg
(74) Attorney, Agent, or Firm—Oblon, Spivak, McClelland, Maier & Neustadt, P.C.

(57) ABSTRACT

A combined cycle power plant is disclosed, which has a backup function operating during the normal operation as well as when the plant is activated, so as to reliably maintain the steam cooling operation when an abnormal phenomenon occurs. In this power plant, the cool steam of the steam cooling system for cooling a high-temperature portion of the gas turbine is the high-pressure exhaust gas of the high-pressure turbine. When the exhaust gas is unexpectedly insufficient, high or medium-pressure steam output from the exhaust heat recovery boiler is introduced as cool steam into the steam cooling system, thereby reliably continuing the steam cooling operation.

3 Claims, 2 Drawing Sheets

COMBINED CYCLE POWER PLANT

TECHNICAL FIELD

The present invention relates to a combined cycle power plant including combined gas and steam turbine plants.

BACKGROUND ART

The combined cycle power plant is a power generation system which has combined gas and steam turbine plants. In this system, the gas turbine takes charge of a higher-temperature range of the thermal energy, while the steam turbine takes charge of the remaining lower-temperature range, thereby efficiently recovering and using the thermal energy. This is currently the most common power generation system.

In order to improve the efficiency, the development of the combined cycle power plant has been focused on how high the higher-temperature range of the gas turbine can be set.

To realize a higher-temperature range, a cooling system must be provided in consideration of the heat resistance of the turbine structure. Conventionally, air is used as a cooling medium in such a cooling system.

However, as long as air is used as the cooling medium, even if a desirable higher-temperature range can be achieved, the plant will inevitably suffer from (i) loss of power necessary for boosting the air (which was used for cooling) up to a specified pressure by using an internal air compressor, and (ii) lowering of the average gas temperature and thus the energy of the gas because the air used for cooling target portions is finally made flow through the passage (in the turbine) together with the high-temperature gas. As a result of the above effects (i) and (ii), it is very difficult to further improve the thermal efficiency.

In order to solve the above problem and to further improve the efficiency, another type of combined cycle power plant has been proposed, in which the steam is used as the cooling medium of the gas turbine instead of air as mentioned above.

Japanese Unexamined Patent Application, First Publication, No. Hei 5-163960 discloses an example thereof. The general structure of the disclosed power plant is shown in FIG. 2.

That is, the combined cycle power plant 10 comprises (i) gas turbine plant 11 mainly including gas turbine 13, air compressor 18, and combustor 19, (ii) exhaust heat recovery boiler 14, mainly comprising high-pressure drum 20, medium-pressure drum 21, and low-pressure drum 22, which uses the exhaust gas from the gas turbine plant 11 as a heat source, and (iii) steam turbine plant 12 mainly comprising high-pressure turbine 15a, medium-pressure turbine 15b, and low-pressure turbine 15c to which the steam is supplied from the exhaust heat recovery boiler 14.

The cooling system employed here is the steam cooling system 50 in which the medium-pressure steam from the medium-pressure drum 21 of the exhaust heat recovery boiler 14 is introduced as the cooling steam via steam supply path 51 into steam cooling section 52 provided in a higher-temperature portion to be cooled in gas turbine 13. That is, the above higher-temperature portion is cooled, and thus the above cooling steam is heated and obtains energy. The cooling steam is then supplied via steam recovery system 53 to the medium-pressure turbine 15b of the steam turbine plant 12. That is, the steam can be efficiently recovered.

Here, steam section 60 is a backup section, and the backup steam can be supplied from the high-pressure drum 20 of the exhaust heat recovery boiler 14 via high-pressure steam line 42. This backup section is used when the gas turbine 13 is activated.

When the gas turbine 13 is activated, the amount of steam generated in the boiler is insufficient due to a delay of the follow-up operation at the exhaust side. Therefore, the steam cooling system 50 cannot operate normally until the insufficiency is corrected, and that is why the backup system using the steam section 60 is necessary.

Although this publication Hei 5-163960 discloses the concept that steam is used as a cooling medium for gas turbine 13, the disclosed system also has many problems when examined in detail.

For example, the backup operation using the steam section 60 is performed to remedy the insufficiency of the amount of steam generated in the boiler when the gas turbine 13 is activated, that is, this operation is not effective when the steam supply to the high-temperature portion (to be cooled) in the gas turbine 13 is cut off due to a problem occurring during the normal loading operation.

That is, the disclosure in Hei 5-163960 does not include the concept of the backup operation necessary for an abnormal phenomenon or condition during the normal loading operation. Therefore, when such an abnormal phenomenon occurs, the cooling medium has to be switched to air, or the gas turbine 13 has to be tripped.

If the cooling medium is switched from steam to air, the cooling ability is obviously insufficient, and thus a measure of reducing the thermal load, such as the running-back of the load of the gas turbine, is necessary.

It is an object of the present invention to solve the above problems in the conventional system, and to provide a combined cycle power plant which has a backup function operating during the normal operation as well as when the plant is activated, so as to reliably maintain the steam cooling operation when an abnormal phenomenon occurs.

DISCLOSURE OF INVENTION

To achieve the above object, the present invention provides a combined cycle power plant having a gas turbine plant and a steam turbine plant combined together, the power plant comprising:

an exhaust heat recovery boiler for generating steam for driving the steam turbine by using exhaust heat from the gas turbine; and a steam cooling system for cooling a target high-temperature portion in the gas turbine by using steam, where superheated steam from the steam cooling system is recovered and used in the steam turbine, and wherein the steam turbine plant comprises at least a high-pressure turbine and a low-pressure turbine, wherein an exhaust gas from the high-pressure turbine is introduced into the steam cooling system, and when the exhaust gas from the high-pressure turbine is unexpectedly insufficient, high or medium-pressure steam output from the exhaust heat recovery boiler is introduced into the steam cooling system.

Accordingly, even if the steam supply to the high-temperature portion to be cooled in the gas turbine plant is stopped due to an abnormal phenomenon, e.g., the high-pressure exhaust gas runs out or is reduced when the steam turbine is tripped during the normal loading operation, high or medium-pressure steam can be immediately supplied as backup steam instead of the high-pressure exhaust gas, thereby reliably continuing the operation of the gas turbine plant.

In the above combined cycle power plant, when the high-pressure steam output from the exhaust heat recovery boiler is introduced into the steam cooling system, saturated steam may be infused so as to control the temperature of the introduced steam.

That is, the backup steam may be saturated steam instead of using saturated water. In this case, it is possible to prevent mist from reaching the high-temperature portion to be cooled of the gas turbine plant, and to prevent problems such as generation of thermal shock and closure of the cooling path near the head of the relevant rotational portion.

MODES FOR CARRYING OUT THE INVENTION

Figure 1:
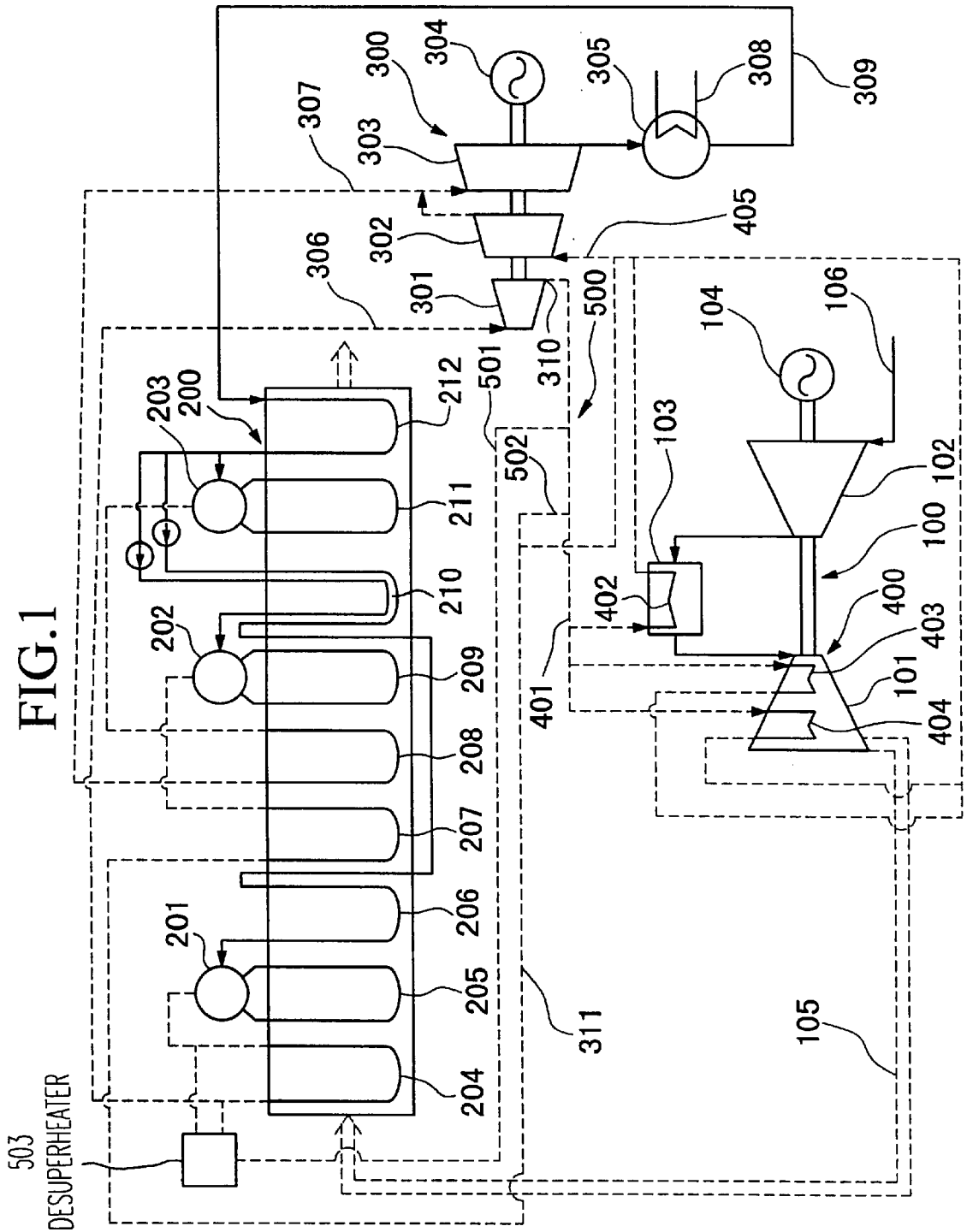
FIG. 1 is a system diagram of the combined cycle power plant as an embodiment according to the present invention.
Figure 2:
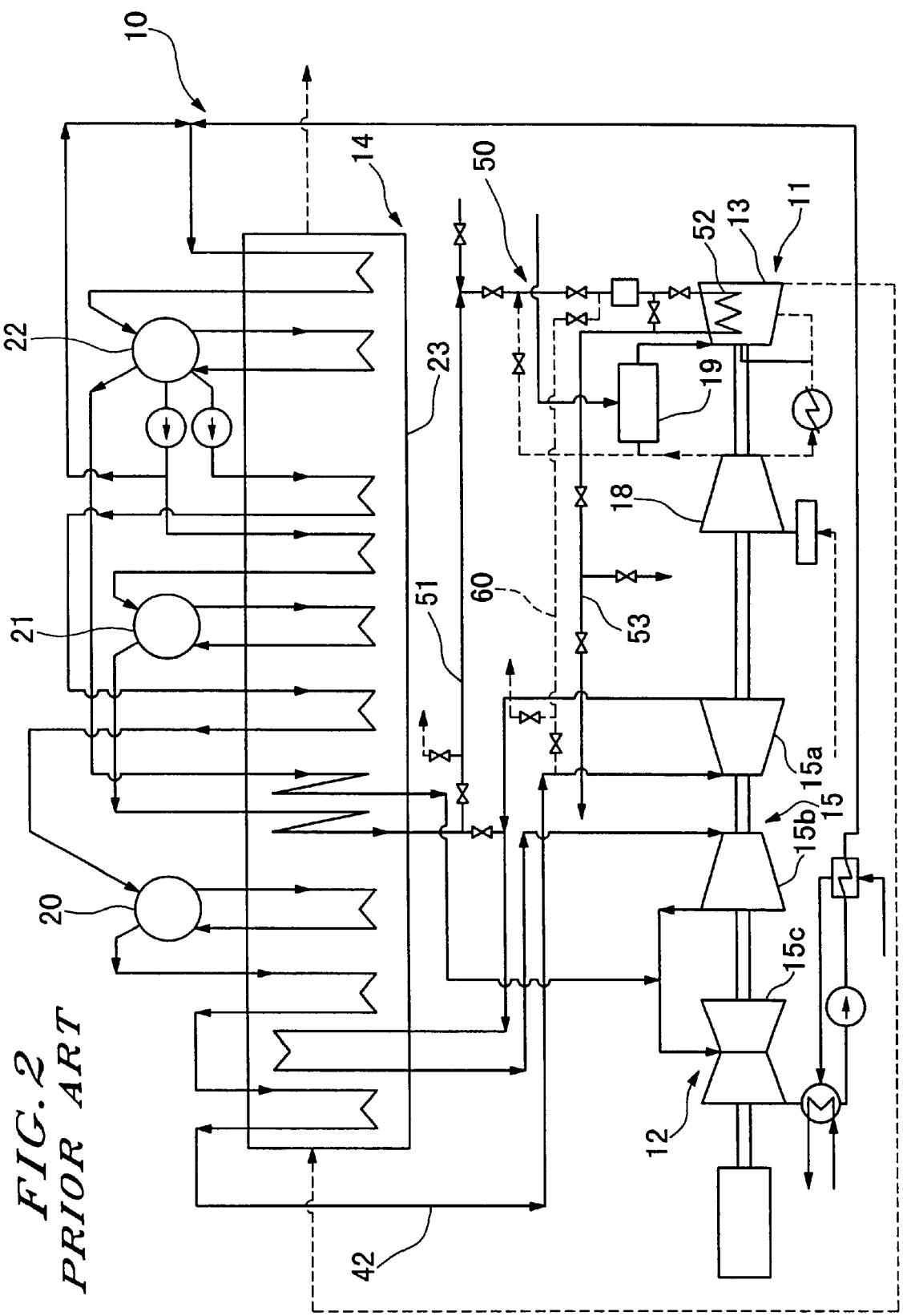
FIG. 2 is a system diagram of a conventional combined cycle power plant.

Hereinbelow, an embodiment of the present invention will be explained in detail with reference to FIG. 1.

In the figure, reference numeral 101 indicates a gas turbine, reference numeral 102 indicates an air compressor driven by the gas turbine 101, and reference numeral 103 indicates a combustor which makes the compressed air (supplied from the air compressor 102) combust using a fuel so as to drive the gas turbine 101. Reference numeral 104 indicates a (power) generator, which is driven together with the air compressor 102. The above gas turbine 101, air compressor 102, combustor 103, and generator 104 constitute gas turbine plant 100.

The exhaust gas from the gas turbine 101 is introduced via exhaust duct 105 into exhaust heat recovery boiler 200. This heat recovery boiler 200 comprises high-pressure superheater 204, high-pressure evaporator 205, high-pressure economizer 206, medium-pressure superheater 207, low-pressure superheater 208, medium-pressure evaporator 209, medium-pressure economizer 210, low-pressure evaporator 211, low-pressure economizer 212, high-pressure drum 201, medium-pressure drum 202, and low-pressure drum 203, where the three drums respectively join with the high-pressure evaporator 205, medium-pressure evaporator 209, and low-pressure evaporator 211. Here, the above exhaust gas is used as a heat source so as to generate three kinds of steam at high, medium, and low pressure values.

Reference numerals 301, 302 and 303 respectively indicate high-, medium-, and low-pressure turbines. The high-pressure turbine 301 is driven using high-pressure steam supplied from the high-pressure superheater 204 of the exhaust heat recovery boiler 200 via high-pressure steam supply line 306, while the low-pressure turbine 303 is driven using mixed steam including (i) low-pressure steam supplied from the low-pressure superheater 208 of the exhaust heat recovery boiler 200 via low-pressure steam line 307 and (ii) the exhaust gas from the medium-pressure turbine 302 explained below.

The medium-pressure turbine 302 does not only depend on the medium-pressure steam supplied from the exhaust heat recovery boiler 200 via medium-pressure steam line 311, but is also driven by using the high-pressure steam whose major constituent is supplied from the high-pressure turbine 301 via the steam recovery section 405. The latter, i.e., the high-pressure exhaust gas, is mainly used here.

These high-pressure, medium-pressure, and low-pressure turbines 301, 302, and 303 are directly combined via a shaft, together with generator 304. This combined portion and condenser 305 connected with the low-pressure turbine 303 constitute the steam turbine plant 300.

Reference numeral 401 indicates a cool steam (i.e., used for cooling) supply system, which is connected with exhaust vent 310 of the high-pressure turbine 301 so as to receive the exhaust gas from the turbine 301.

Reference numeral 402 indicates the first steam cooling section, branching off from the cool steam supply system 401, for cooling the combustor 103. Reference numerals 403 and 404 respectively indicate the second and third steam cooling sections. They also branch off from the cool steam supply system 401 as the first steam cooling section 402, and cool the target high-temperature portion of the gas turbine 101.

These parallel-arranged first, second, and third steam cooling sections 402, 403, and 404 constitute steam cooling system 400. The high-pressure exhaust gas supplied to each cooling section is used as a cooling medium for cooling the target high-temperature portion. These cooling media are then merged again and introduced into the medium-pressure turbine 302 via steam recovery section 405.

Reference numeral 501 indicates the first backup steam-cooling section, through which the high-pressure steam from the high-pressure drum 201 can be supplied via to desuperheater 503 to the cool steam supply system 401. Reference numeral 502 indicates the second backup steam-cooling section, through which the medium-pressure steam from the medium-pressure drum 202 can be supplied to the cool steam supply system 401.

The cool steam supply system 401, the first backup steam-cooling section 501, and the second steam-cooling section 502 respectively have control valves (not shown) which are controlled in a coordinated operation. When the cool steam supply system 401 stops the supply of the high-pressure exhaust gas from the high-pressure turbine 301, at least one of the first and second backup steam-cooling sections 501 and 502 supplies the high-pressure or medium-pressure steam to the cool steam supply system 401 so that the high-pressure or medium-pressure steam can function as backup steam when the high-pressure exhaust gas is stopped.

That is, the first and second backup steam-cooling sections 501 and 502 constitute the backup section 500 of the steam cooling system 400.

The second backup steam-cooling section 502 using the medium-pressure steam can also be used during normal operation. If this section 502 is normally operated, when the high-pressure exhaust gas runs out, the backup steam is smoothly supplied from the second backup steam-cooling section 502, and then the backup steam from the first backup steam-cooling section 501 is supplied. In this process, the backup steam from the first backup steam-cooling section 501 is controlled so that the pressure and temperature thereof have approximately the same levels as those of the high-pressure exhaust gas, by using mixed steam of saturated steam from the high-pressure steam drum 201 and the steam output from the high-pressure superheater 204.

The second backup steam-cooling section 502 may have the same system arrangement as that of the first backup steam-cooling section 501 so as to obtain backup steam whose pressure and temperature have approximately the same levels as those of the high-pressure exhaust gas in consideration of the thermal balance of the system.

In addition, reference numeral 106 indicates an air supply system for supplying air to the air compressor 102, reference numeral 308 indicates a cooling-water supply system for supplying cooling water to condenser 305, and reference numeral 309 indicates a water supply system through which the condensate (i.e., condensed water) obtained by condenser 305 is supplied to the exhaust heat recovery boiler 200.

Almost all of the steam introduced into the high-pressure turbine 301 passes through the cool steam supply system 401 as the high-pressure exhaust gas, and is heated by the target portion to be cooled and introduced into the medium-pressure turbine 302. After the steam enters the medium-pressure turbine 302 and works in the turbine, this steam passes through the low-pressure turbine 303 and flows into condenser 305.

That is, according to the present embodiment, when the target high-temperature portion in the gas turbine plant 100 is cooled, the high-pressure exhaust gas of the high-pressure turbine 301 is selected as the cooling medium from among the high-pressure exhaust gas in the steam turbine plant 300, and the high-pressure steam, medium-pressure steam, and low-pressure steam in the exhaust heat recovery boiler 200, in consideration of optimal values related to quantity, pressure, or temperature, and of optimization of the system operational efficiency. Consequently, a quantity of heat is generated via the cooling of the high-temperature portion (to be cooled) in the gas turbine plant 100, and the heat is supplied to the medium-pressure turbine 302 so that the heat is not discharged to the outside of the system but recovered, thereby improving the thermal efficiency.

The operating steam in the medium-pressure turbine 302 is supplied from the gas turbine plant 100 as described above; thus, no reheater is necessary in the exhaust heat recovery boiler 200. Therefore, the cost for designing and manufacturing the plant can be greatly reduced.

In addition, if the steam turbine plant 300 is tripped during the system operation and the high-pressure exhaust gas runs out or is reduced, the function (of the cool steam supply system 401) of supplying the high-pressure exhaust gas is made completely ineffective, any one or both of the first and second backup steam-cooling sections 501 and 502 are used so as to supply high or medium-pressure steam to the cool steam supply system 401. That is, the cutoff of the supply of the high-pressure exhaust gas is compensated for by using high or medium-pressure steam. The backup steam (i.e., high pressure or medium pressure) is determined according to the conditions of the working high-pressure exhaust gas detected before the gas supply is stopped.

Generally, it is preferable to use a high-pressure saturated steam whose temperature and pressure are reduced using desuperheater 503. This is because mist otherwise reaches the high-temperature portion to be cooled in the gas turbine plant 100, so that thermal shock may occur or the cooling path may be closed near the head of the relevant rotational section due to cooperation of the mist and the centrifugal force. Therefore, it is preferable to use the above temperature-reduced steam (using saturated steam) for preventing the generation of mist and the above problems.

If the high-pressure exhaust gas of the high-pressure turbine 301 is directly used, it is preferable to suppress the pressure loss via the high-pressure portion to be cooled in the gas turbine plant 100 as much as possible, so as to maintain the operational efficiency of the plant.

That is, in order to increase the pressure at the inlet of the steam turbine as much as possible, the first, second, and third steam cooling sections 402, 403, and 404 are branched in parallel in the section of supplying cool steam to the target portion to be cooled, thereby suppressing the pressure loss in the present embodiment.

The present invention is not limited to the embodiment explained above, but each element in the embodiment can be variously modified within the scope of the claimed invention.

INDUSTRIAL APPLICABILITY

In the combined cycle power plant of the present invention, the high-pressure exhaust gas is basically used for cooling the target high-temperature portion of the gas turbine plant because the high-pressure exhaust gas is most suitable from any of the viewpoints of quantity, pressure, and temperature. Accordingly, even if the temperature of the high-pressure portion to be cooled is further increased, or even if the target high-temperature area is extended, the necessary cooling process can be performed. According to the present invention, even if the high-pressure exhaust gas has run out or is reduced when the steam turbine is tripped or the like, the high-pressure or medium-pressure steam as a substitute for the high-pressure exhaust gas is immediately supplied so that the operation of the gas turbine plant is continued.

In addition, the backup steam may be saturated steam instead of using the conventional saturated water. In this case, it is possible to prevent mist from flying to the high-temperature portion to be cooled of the gas turbine plant, and to prevent problems such as generation of thermal shock and closure of the cooling path near the head of the relevant rotational portion.

What is claimed is:

1. A combined cycle power plant having a gas turbine plant and a steam turbine plant combined together, the steam turbine plant comprising at least a high-pressure turbine and a low-pressure turbine, and the combined cycle power plant comprising:

an exhaust heat recovery boiler for generating steam for driving the steam turbine by using exhaust heat from the gas turbine;

a steam cooling system having parallel-arranged first, second, and third steam cooling sections for cooling a high-temperature portion in the gas turbine by using steam, where superheated steam from the steam cooling system is recovered and used in the steam turbine;

an exhaust steam introducing system for introducing almost all of an exhaust steam from the high-pressure turbine into the steam cooling system; and a backap steam introducing system for introducing at least one of saturated high-pressure steam and saturated medium-pressure steam output from the exhaust heat recovery boiler into the steam cooling system when the exhaust steam from he high-pressure turbine is insufficient, the backup steam introducing system including;

a first backup steam-cooling section for supplying saturated high-pressure steam which is output from the exhaust heat recovery boiler and whose temperature and pressure are reduced using a desuperheater; and a second backup steam-cooling section for supplying saturated medium-pressure steam output from the exhaust heat recovery boiler through a medium-pressure superheater.

2. A combined cycle power plant having a gas turbine plant with a gas turbine and a steam turbine plant with a steam turbine combined together, the power plant comprising:

an exhaust heat recovery boiler for generating steam for driving the steam turbine by using exhaust heat from the gas turbine; and a steam cooling system for cooling a target high-temperature portion in the gas turbine by using steam, where superheated steam from the steam cooling system is recovered and used in the steam turbine, wherein the steam turbine plant comprises at least a high-pressure turbine and a low-pressure turbine, wherein the high-pressure turbine is connected to the steam cooling system such that the high-pressure turbine is configured to introduce exhaust steam into the steam cooling system, wherein a high-pressure drum of the exhaust heat recovery boiler is connected to the steam cooling system such that high-pressure steam output from the exhaust heat recovery boiler is selectively introduced into the steam cooling system, and wherein a connection between the high-pressure drum of the exhaust heat recovery boiler and the steam cooling system includes a device configured to infuse saturated steam into the high-pressure steam output from the exhaust heat recovery boiler so as to control a temperature of the steam introduced into the steam cooling system.

3. A method of operating a combined cycle power plant having a gas turbine plant and a steam turbine plant combined together, the steam turbine plant comprising at least a high-pressure turbine and a low-pressure turbine, and the method comprising:

an exhaust heat recovery step of generating steam for driving the steam turbine by using exhaust heat from the gas turbine;

a steam cooling step of cooling high-temperature portion in the gas turbine by introducing almost all of an exhaust steam from the high-pressure turbine;

a recovery step of returning superheated steam heated by cooling the high-temperature portion to the steam turbine; and a backup steam introducing step of introducing at least one of saturated high-pressure steam and saturated medium-pressure steam for backup use output from the exhaust heat recovery boiler into the steam cooling system when the exhaust steam from the high-pressure turbine is insufficient, including:

a first backup step for supplying saturated high-pressure steam which is output in the exhaust heat recovery step and whose temperature and pressure are reduced using a desuperheater; and a second backup step for supplying saturated medium-pressure steam output in the exhaust heat recovery step through a medium-pressure superheater.

* * * * *